(12) United States Patent
Mensch

(10) Patent No.: US 7,426,769 B2
(45) Date of Patent: Sep. 23, 2008

(54) STALL AND MANURE VACUUM TRUCK

(76) Inventor: Donald L. Mensch, 314 - 100th St., SE., Byron Center, MI (US) 49315

( * ) Notice: Subject to any disclaimer, the term of this patent is extended or adjusted under 35 U.S.C. 154(b) by 167 days.

(21) Appl. No.: 11/408,138

(22) Filed: Apr. 20, 2006

(65) Prior Publication Data

US 2007/0245512 A1    Oct. 25, 2007

(51) Int. Cl.
A47L 5/00 (2006.01)
(52) U.S. Cl. .................... 15/340.1; 15/352; 15/401
(58) Field of Classification Search ........... 15/340.1, 15/401, 402, 347, 352
See application file for complete search history.

(56) References Cited

U.S. PATENT DOCUMENTS

| | | | |
|---|---|---|---|
| 2,193,784 A | 3/1940 | Smith | |
| 3,300,807 A | 1/1967 | Berkowitz | |
| 3,406,424 A | 10/1968 | Rush | |
| 3,460,185 A | 8/1969 | Cook | |
| 3,460,186 A | 8/1969 | Sherrill et al. | |
| 3,474,483 A | 10/1969 | Heidland | |
| 3,505,703 A | 4/1970 | Miller et al. | |
| 3,634,903 A | 1/1972 | Larsen | |
| 3,675,266 A | 7/1972 | Murray et al. | |
| 3,722,025 A | 3/1973 | Gledhill | |
| 3,870,489 A | 3/1975 | Shaddock | |
| 4,110,864 A | 9/1978 | Gunnarsson | |
| 4,193,159 A | 3/1980 | Beard, III | |
| 4,199,837 A * | 4/1980 | Fisco, Jr. ..................... | 15/302 |
| 4,289,439 A | 9/1981 | Hansson | |
| 4,578,840 A * | 4/1986 | Pausch ........................ | 15/352 |
| 4,580,312 A | 4/1986 | Van Raaij | |
| 4,661,046 A | 4/1987 | Ruyle | |
| 4,845,801 A * | 7/1989 | Milly et al. ................... | 15/321 |
| 4,885,817 A | 12/1989 | Tanase | |
| 4,925,467 A * | 5/1990 | Jordan et al. .................. | 55/430 |
| 4,978,068 A | 12/1990 | Eldridge | |
| 5,010,620 A | 4/1991 | Young | |
| 5,173,989 A | 12/1992 | Young et al. | |
| 5,185,899 A | 2/1993 | Urbani | |
| 5,317,783 A | 6/1994 | Williamson | |
| 5,337,444 A | 8/1994 | Young et al. | |
| 5,596,788 A | 1/1997 | Linville et al. | |
| 5,787,613 A | 8/1998 | Derome | |
| 5,839,157 A | 11/1998 | Strauser et al. | |
| 5,890,558 A | 4/1999 | Keegan | |
| 5,996,171 A | 12/1999 | Bowers | |
| 6,000,647 A | 12/1999 | Hardy | |

(Continued)

*Primary Examiner*—Dung Van Nguyen
(74) *Attorney, Agent, or Firm*—Price, Heneveld, Cooper, Dewitt & Litton LLP

(57) ABSTRACT

A vacuum truck includes a self-propelled vehicle, a storage tank, a vacuum source, a laterally-shiftable scraper, and a pullback scraper. Suction lines connect a collection area of the scrapers to the storage tank and to the vacuum source. The exhaust from the vacuum system heats the collection area and the suction line to prevent plugging by the cold vacuumed material. The vehicle's engine exhaust can also be controlled to serve as a second heat source that can be used. A fluffer comprises a rake pivoted to the scraper is extendable for fluffing bedding while performing the vacuuming operation. The truck includes a front discharge opening and auger for emptying the tank. The driver's cabin is in front and has high and low windows, such that all vehicle operations are easily seen.

32 Claims, 6 Drawing Sheets

U.S. PATENT DOCUMENTS

2002/0148068 A1    10/2002   Legatt et al.
2006/0059652 A1 *  3/2006    Vry .......................... 15/340.1

2006/0236498 A1 *  10/2006   Nuhn ....................... 15/340.1

* cited by examiner

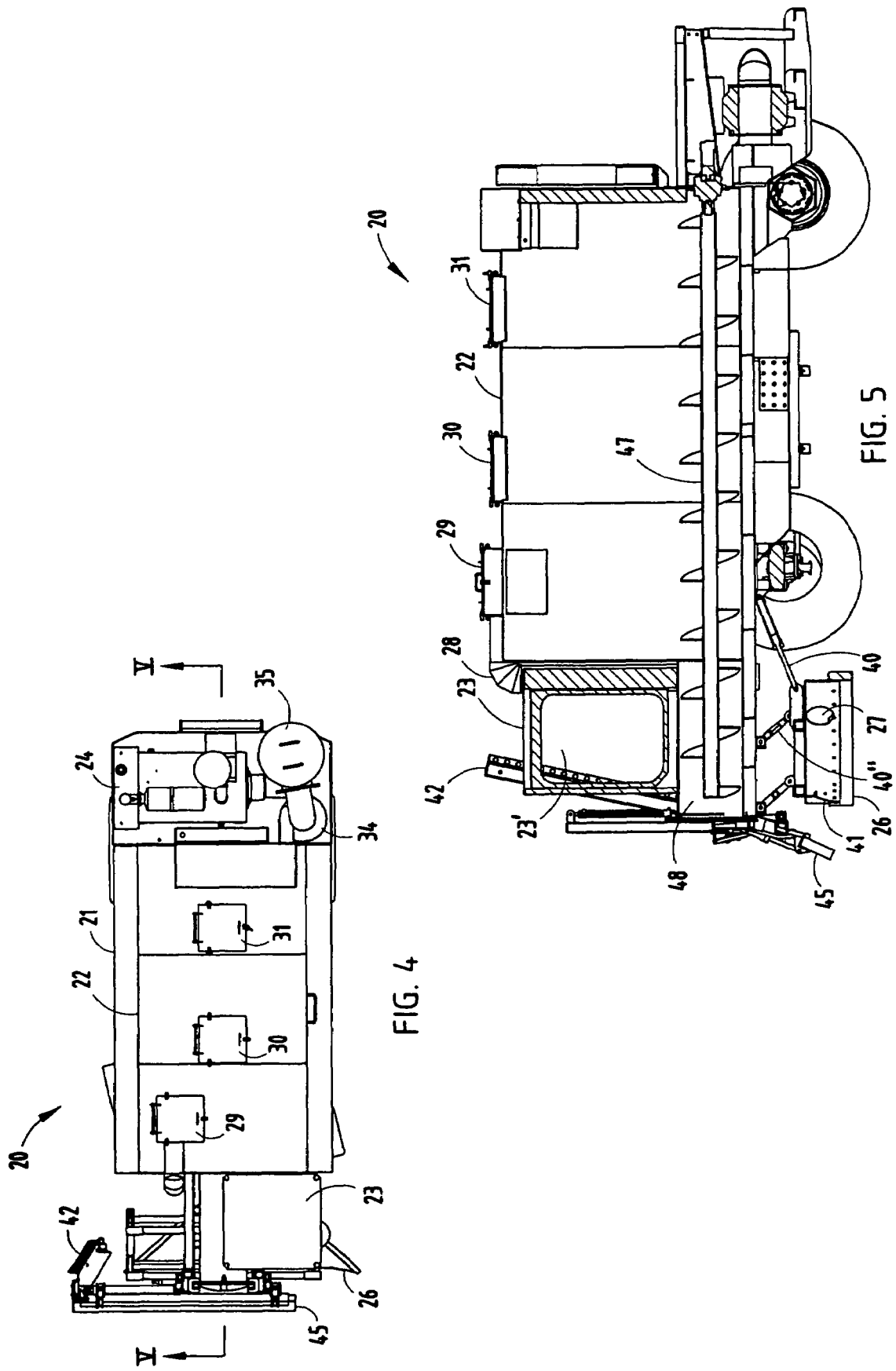

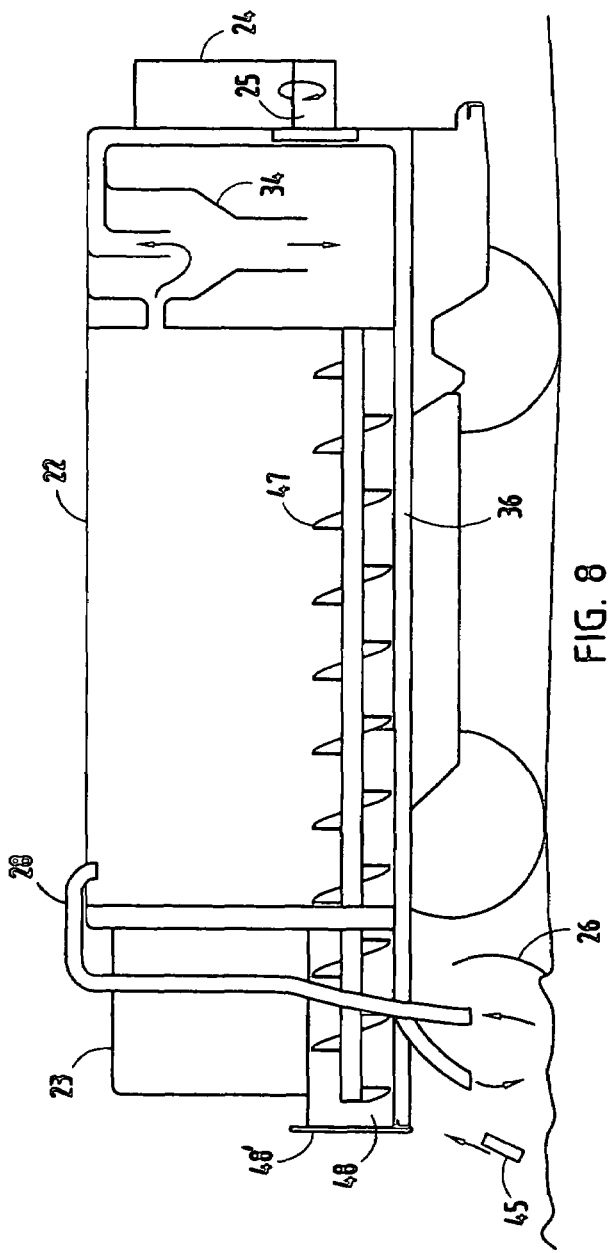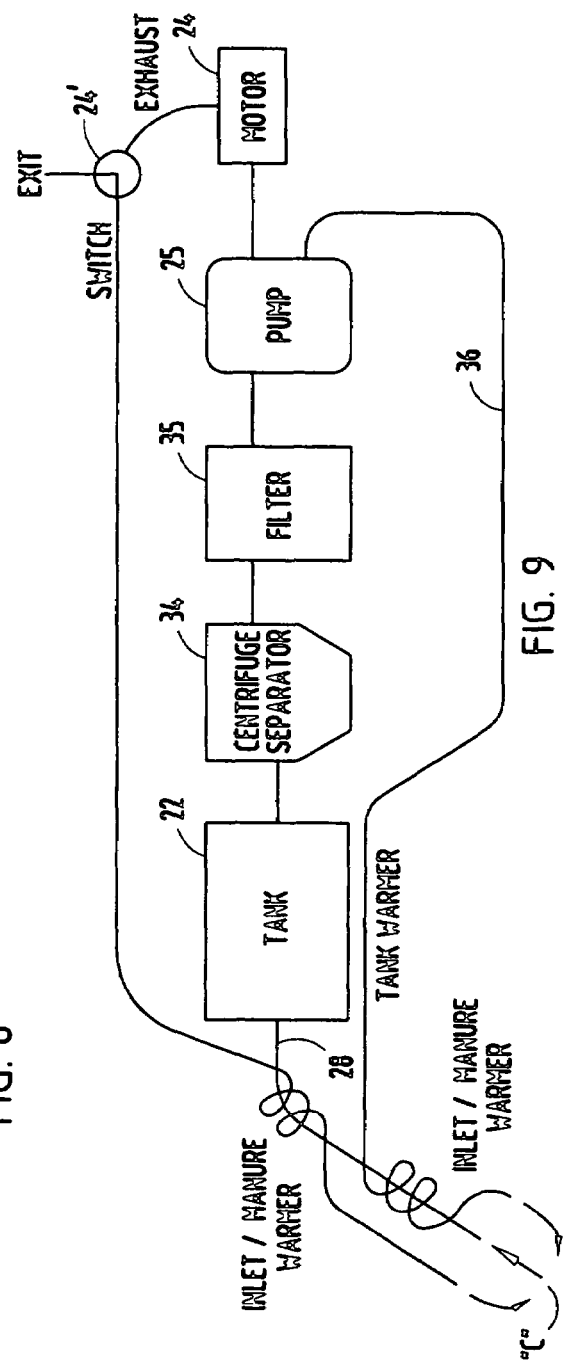

STALL AND MANURE VACUUM TRUCK

BACKGROUND

The present invention relates to vacuum trucks adapted for vacuum collection of stall and manure material. More particularly, the present invention relates to a self-contained, self-propelled, steerable vacuum truck adapted for use in tight quarters, such as in an alley, and that is also adapted for use during cold weather. However, it is contemplated that various features of the present invention are not limited to only collection of stall and manure material, nor to only use during cold weather.

Modern large-scale animal, farming and dairy operations require equipment that is rugged, durable, and efficient to use. In particular, collection of stall and manure material from animal stalls can be difficult since it is time-consuming, must be done often, and further must be done in tight quarters, such as along narrow alleys with animal stalls on one or both sides. Some vacuum equipment of interest have been proposed. However, further improvement is desired to allow the equipment to be used in cold weather when the stall and manure material is thicker and more difficult to handle. Also, improvements are desired for self-contained operation, better driver visibility and improved vehicle control, in order to improve efficient vehicle operation while reducing damage to stalls. In particular, stalls often include protrusions, posts, and secondary (and primary) walls that, if struck by unforgiving powerful equipment, will break and/or be damaged. Also, improvements are desired to allow multiple functions to be performed while operating the equipment. Still further, it is desirable to provide a vacuum truck engineered to be well-balanced for good weight distribution and operation, and that is unloadable efficiently with a positive mechanism to a location where the discharge can be seen and controlled.

Thus, an apparatus having the aforementioned advantages and solving the aforementioned problems is desired.

SUMMARY OF THE PRESENT INVENTION

In one aspect of the present invention, a vacuum truck for use in cold and inclement weather to collect cold stall and manure material by vacuum, includes a self propelled steerable vehicle having a frame. A storage tank and scraper are mounted on the frame, the scraper defining a collection area for scraped stall and manure material. A suction line connects the collection area to the storage tank. A vacuum source is operably connected to at least one of the collection area, the suction line, and the storage tank for creating suction to move the stall and manure material from the collection area along the suction line into the storage tank. A heat source is operably connected to and heats at least one of the collection area and the suction line. By this arrangement, the vacuum truck can be used in cold and inclement weather without the cold stall and manure material collecting and plugging the collection area and plugging the suction line.

In another aspect of the present invention, a vacuum truck for collecting stall and manure material by vacuum, includes a self-propelled steerable vehicle having a frame, a front-mounted cabin on the frame for a driver operating the vehicle, and a scraper supported on the frame and located at least as far forward as the cabin and visible from the cabin. The scraper is configured to collect stall and manure material. A vacuum suction apparatus is provided on the frame for vacuuming the stall and manure material collected in front of the scraper and for moving the material to a tank.

In another aspect of the present invention, a vacuum truck includes a self-propelled steerable vehicle with a frame. At least one scraper is supported on the frame and located at a front end of the frame. The at least one scraper is shiftable relative to the frame between a home position generally under on the frame, and a horizontally shifted position for reaching stall and manure material not reachable from the home position. A vacuum suction apparatus on the frame is provided for vacuuming stall and manure material collected by the at least one scraper and for moving the material to a tank.

In a narrower form, the at least one scraper includes a scraper configured for collecting stall and manure material when moving in a forward direction.

In another narrower form, the at least one scraper includes a pull-back scraper configured to be extended to pull stall and manure material from a wall in front of the truck.

In another narrower form, the at least one scraper includes both a forward-collection scraper and a pull-back scraper.

In another aspect of the present invention, a vacuum truck includes a self-propelled steerable vehicle with a frame, and a storage tank and scraper on the frame. A vacuum suction apparatus is positioned on the frame for vacuuming manure and stall material collected in front of the scraper and for moving the material to the storage tank. An outlet opening connected to the storage tank extends forwardly for emptying the storage tank, the outlet opening being located to dump collected stall and manure material from a front of the frame.

In another aspect of the present invention, a vacuum truck includes a self-propelled steerable vehicle with a frame, and a storage tank and a scraper mounted on the frame. The scraper defines a collection area, and a suction line extends from the collection area to the storage tank. A vacuum source is operably connected to at least one of the collection area, the suction line, and the storage tank for creating suction to move the stall and manure material from the collection area along the suction line into the storage tank. A fluffer apparatus is connected to the scraper and is extendable from the scraper for simultaneously fluffing bedding in stalls while simultaneously vacuuming stall and manure from the stalls.

These and other aspects, objects, and features of the present invention will be understood and appreciated by those skilled in the art upon studying the following specification, claims, and appended drawings.

BRIEF DESCRIPTION OF DRAWINGS

FIGS. 1-4 are front perspective, rear perspective, side, and top views of a vacuum truck embodying the present invention.

FIG. 5 is a cross section taken along the line V-V in FIG. 4.

FIG. 8 is a side cross-sectional view similar to FIG. 5, but schematically showing the vacuum system and tank.

FIG. 9 is a schematic view showing the vacuum system of FIG. 8 and related air flow lines, centrifuge separation device, and control valving.

DETAILED DESCRIPTION OF PREFERRED EMBODIMENTS

Figure 1:
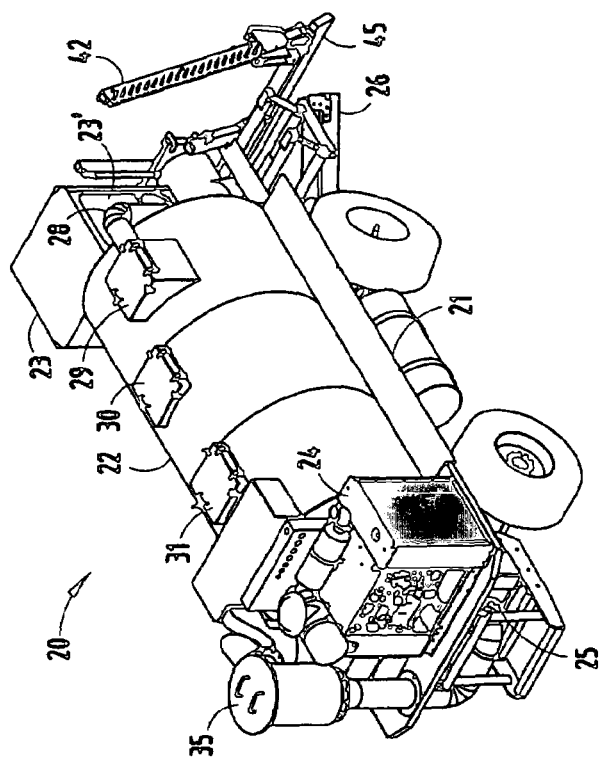
Figure 2:
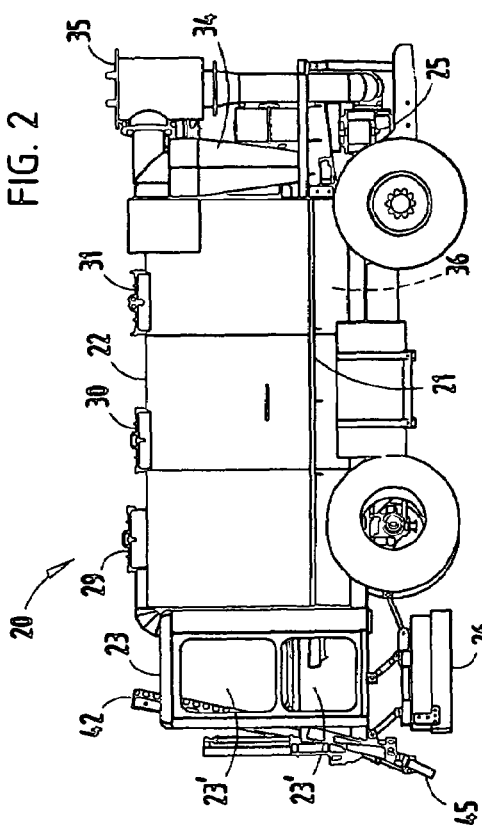
Figure 3:
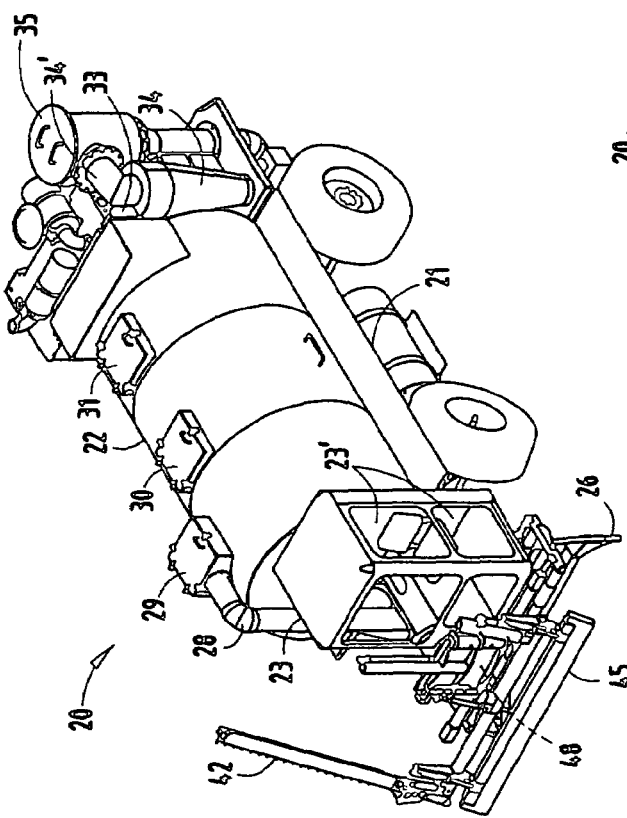
Figure 6:
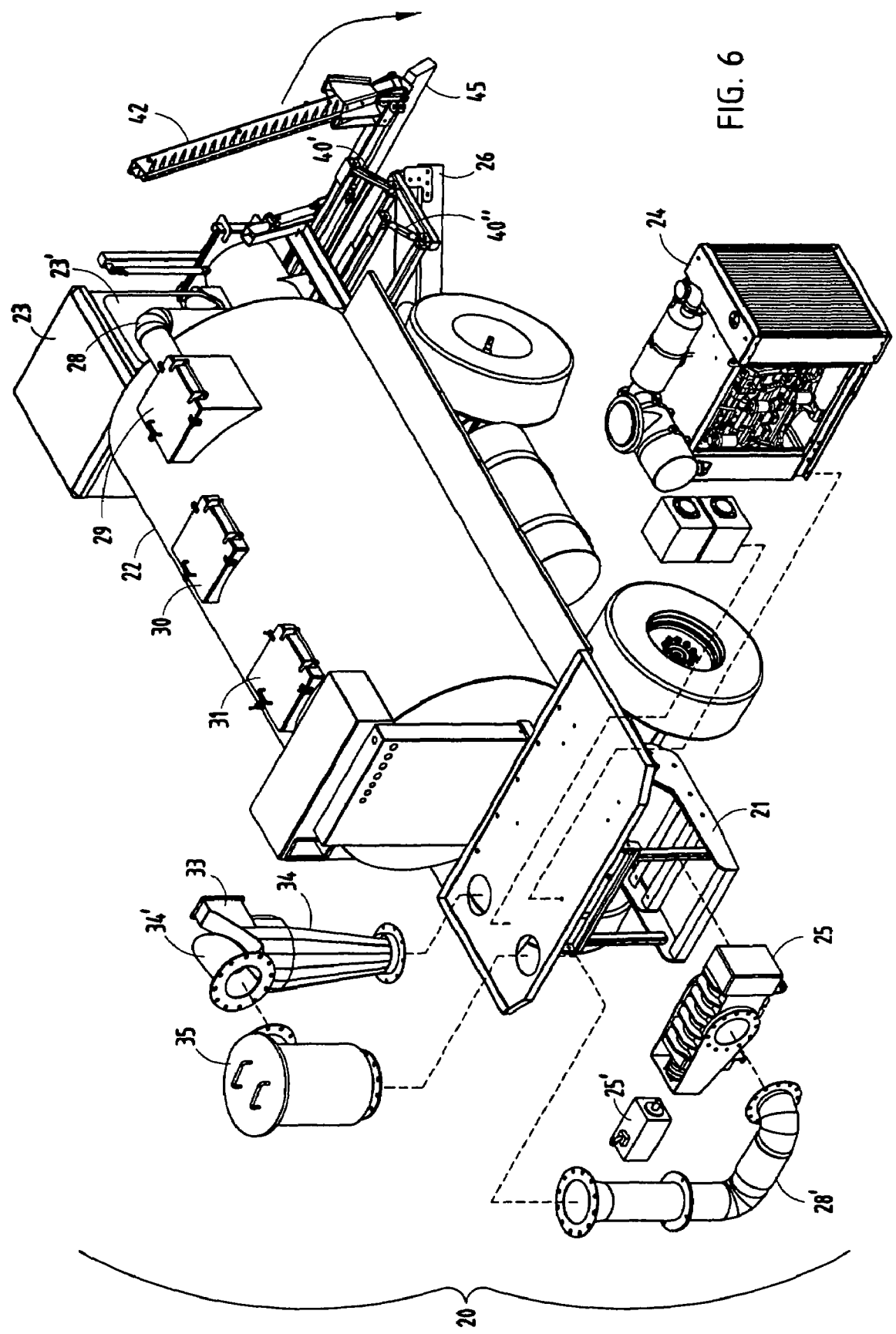
FIGS. 6-7 are exploded views of FIGS. 1-2, respectively.

A vacuum truck 20 includes a self-propelled vehicle with frame 21, and a storage tank 22, a vacuum source 25, a laterally-shiftable scraper 26, and a pull back scraper 45 mounted on the frame 21. Suction lines 28 and 28' connect a collection area of the scrapers 26/45 to the storage tank 22 and to the vacuum source 25. The naturally heated exhaust from the vacuum source 25 is fed under the tank 22 to warm the tank 22 and is fed to the collection area in front of scraper 26. It also heats the suction line 28 to prevent plugging by the cold vacuumed stall and manure material. Exhaust from the vehicle's engine 24 is also selectively controlled by a deflector valve 24' (FIG. 9) to heat the collection area and/or the suction line 28 as a second heat source for very cold weather. A fluffer 42 comprises a rake arm pivoted to an outer end of the scraper 26 and is extendable for fluffing bedding while performing the vacuuming operation. The truck 20 includes an auger 47 along an inside bottom of the tank 22. The auger 47 extends to a front discharge opening 48 for front-dump emptying of the tank 22 over a front of the scrapers 26/45. The driver's cabin 23 is in front and has high and low windows 23 with low bottom edges, such that all vehicle operations are easily seen.

More specifically, the present apparatus 20 (FIGS. 1-5) includes a wheeled frame 21, the tank 22 in a middle of the frame 21, the driver cabin 23 on a front of the frame 21, and a diesel power unit/engine 24 and a lobe-type air pump forming the vacuum source 25 at a rear of the frame 21 (in a location where weight is balanced and noise to the operator/driver is minimized). A concave scraper 26 is positioned in front of the front wheels generally under the vehicle's cabin 23. The cabin 23 has high and low windows 23' so that operation of the scraper can be easily seen, which helps when operating the equipment in tight quarters such as in an alley between animal stalls or along a wall. A top plate 26' of decking is attached to the scraper 26 to better capture the manure, and defines a collection area "C" in front of the scraper 26. A subframe 26" mounts the scraper 26 to the frame 21 for lateral shifting movement. The vacuum device arrangement includes an inlet 27 in the top plate. The vacuum line 28 includes a flexible lower hose (permitting the scraper 26 to move laterally without restriction) connected to the inlet 27 and a hard upper hose that extends into an inlet 29 in the tank 22. Access ports 30 and 31 are provided on a top of the tank 22, and floating valves are positioned thereunder to prevent spillage and to seal the ports 30, 31. The collected debris and manure are transported primarily by air flow created by the lobe pump of the vacuum source 25 (venturi-type effect, max vacuum of about 10 to 15 inches mercury). The pump 25 is controlled by control valving 25' or in the cabin 23. The suction head (i.e., vacuum "strength") has a lower head pressure than a blade-type vacuum unit. This is seen to be an advantage since air flow carries the stall and manure material . . . not vacuum pressure. Air flows from the tank 22 through a line 33 to centrifuge separator 34 and through a line 34' to an exit air filter 35 and line 28' to the vacuum pump 25. Air gains about 100 degrees Fahrenheit in passing through the pump 25. This exit air is fed through a line 36 under the tank 22 to a location in front of the scraper 26, in order to warm the stall and manure material being collected. The exhaust gases from the engine 24 can also be used for either heating the scraper 26 or for heating the top plate of the scraper or for heating the suction line 28. A deflector valve 24' is selectively operated to control the direction of flow of the engine exhaust. An advantage of the present apparatus is that it can be used in winter as well as summer, because of the warming aspect from the vacuum exhaust and the higher heat of the engine exhaust, as discussed below.

The scraper 26 is includes a top plate/deck 26' slidably mounted on a pair of rails 39 under a front frame portion 38 of the apparatus 20. Hydraulic cylinder(s) 40 is connected to the scraper 26 for lifting the scraper 26 up and down using pivoting links 40", and a second hydraulic cylinder 40' is arranged to shift/move the scraper 26 laterally. The cylinder 40' for lateral movement biases the scraper outwardly but also allows it to move away from resistance encountered by the scraper 26 as the scraper 26 moves along a wall. An outer end of the scraper 26 includes an angled surface on a slip-past abutment member (such as a skid block 41 or abutment wheel) adapted to abuttingly slidingly (or rollingly) engage a wall to help move the scraper 26 over and past obstructions. For example, the illustrated skid block 41 includes an angled surface that engages and tends to slide over protrusions in the wall as the scraper 26 is shifted laterally (and rearwardly slightly) to allow movement past the abutment. By this arrangement, the apparatus 20 can be driven along a wall with the scraper 26 adjacent and rubbing the wall . . . but the skid block 41 "bounces" or pushes the scraper away from the wall when a protruding obstacle is encountered. Thus, the wheels of the vehicle are positioned away from the wall, and the wall does not experience the shearing/damaging force of engaging the wheels or the vehicle frame. After moving past the obstacle, the scraper 26 is biased back tight against the wall. The scraper 26 is shiftable in either direction D1, such that the vehicle 20 can be driven along either side of the alley.

Figure 7:
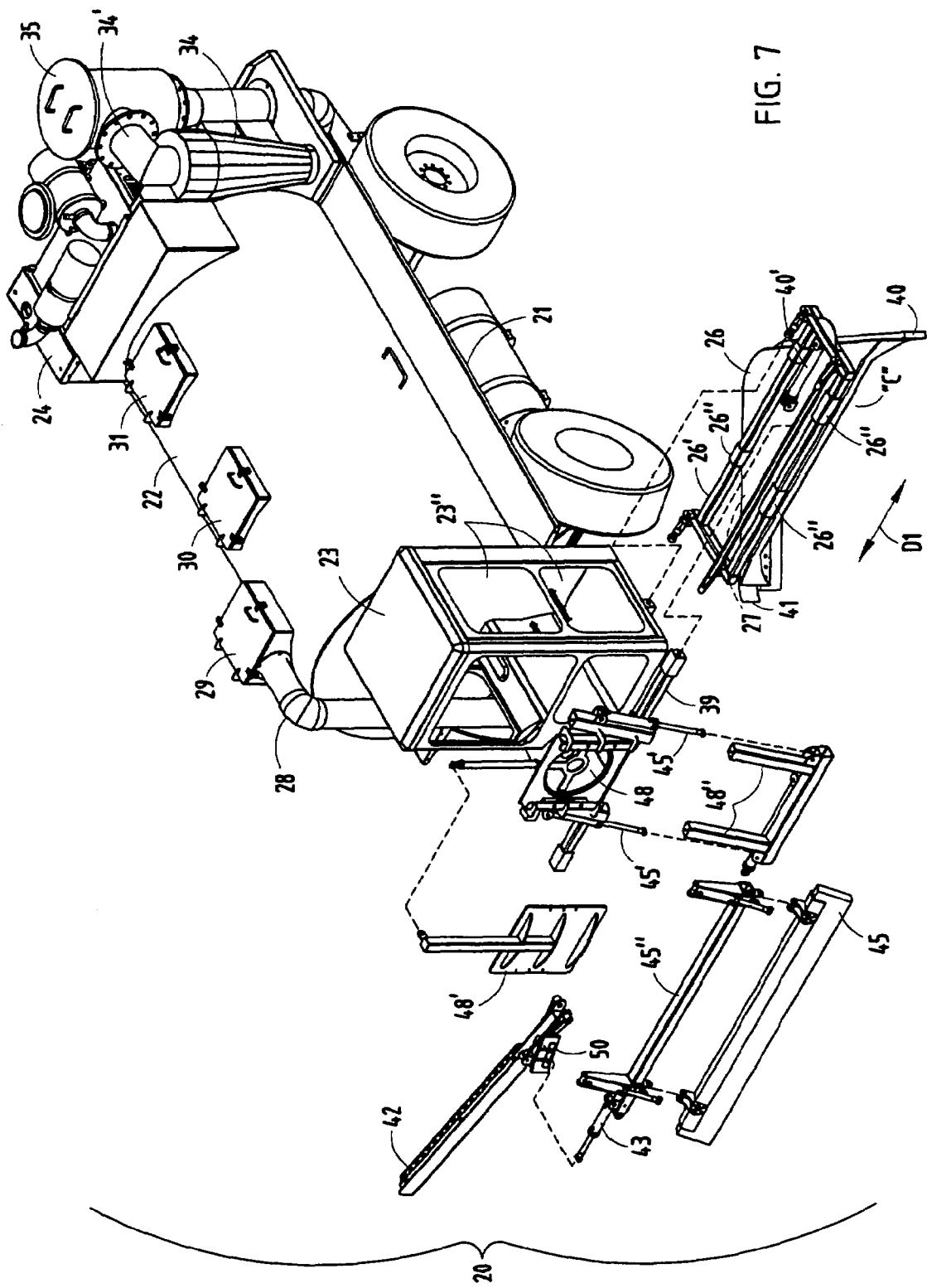
Figure 10:
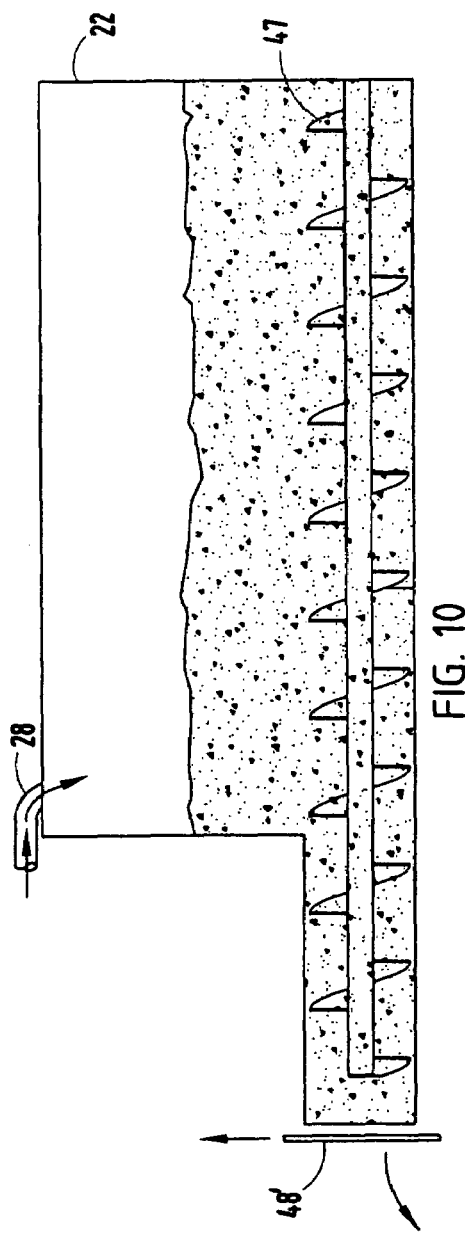
FIG. 10 is a schematic view showing the storage tank, auger agitator, discharge opening and gate valve for controlling the emptying of the tank.
Figure 11:
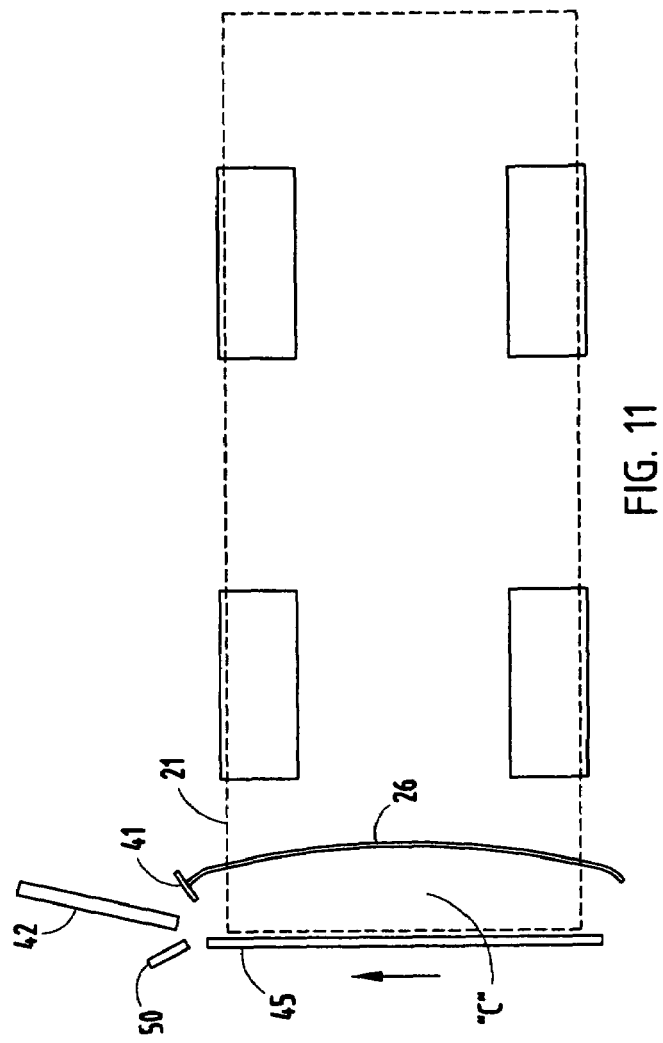
FIG. 11 is a plan view of the footprint of the scrapers, as compared to the vehicle wheels.

A fluffing rake 42 (i.e., a secondary scraper) is pivotally mounted on an outboard end of the scraper 45 by a pivot structure adjacent the illustrated plow 50 (FIG. 7). The rake 42 is extendable to drag along a cow stall under secondary separating walls and to smooth the bedding simultaneous with the vacuuming operation. This saves the need for repeated trips to do all functions required, and also saves the need for multiple separate equipment. The rake 42 can be extended by use of cylinder 43. A plow 50 can be positioned at an outboard end of the scraper 26 or at an inboard end of the fluffing rake 42 at a location where it scrapes manure several inches into a cow stall from the open end of a cow stall. This allows a farm worker to simultaneously clean the first few inches of a cow stall while doing the vacuum manure collection. This is very advantageous and works well, since cows and animals tend to push bedding from a front to a rear of their stalls. Thus, the greatest need for cleaning is at an outer end of the stall.

A pull back scraper 45 is mounted to a front of the frame 38 by subframe 45 for vertical movement (at a slight forward angle) by cylinders 45'. The scraper 45 is at a very front of the vehicle, so that the apparatus 20 can drive up to the end of an aisle or alley-way, and drop the scraper 45 to pull back manure and the like positioned against an end wall. By this arrangement, a more complete cleaning can be accomplished.

The auger 47 extends through a bottom of the tank 22 and extends out to a front outlet/discharge opening 48 under and in front of the cabin 23. The auger 47 is adapted to agitate the slurry of manure to prevent settling when collecting the stall and manure material, and also is adapted to facilitate dumping. A guillotine-style gate 48' is positioned in the opening 48 and is movable from a lowered sealing position to a raised open position. In the lower position, side supports 48" are angled to wedgingly hold the gate 48' tight against the opening 48 for good sealing. During the dump cycle, the collected stall and manure material is urged forwardly by the auger 47 and flows forwardly to dump over the pull-back scraper 45 and well forward of the vehicle front wheels. It is noted that the opening 48 is in a location easily seen by the driver, such that dumping can be done with good control and be done efficiently.

It is contemplated that the four wheels of truck 20 can be a two-wheel drive with steering ability, a four wheel drive with steering ability, or a "crab steer" arrangement where individual wheel rotation is individually controlled. A total length of the present device is about 21 feet and under 10 feet tall, which allows the vehicle to fit into alleys and tight quarters, as required in many farm, animal, and dairy operations.

In operation, the vacuum truck 20 is aligned with an alley to be cleaned, and the scraper 26 is lowered . . . and if present, the fluffing rake 42 is lowered. Also, the scraper 26 is shifted laterally to a desired side-extended position. Also, the vacuum pump 25 is started, and the appropriate heat from the vacuum exhaust and/or the engine exhaust is channeled to the collection area of the scraper 26. The vehicle 20 is then driven along an alley, such as along an outer end of stalls, with the vehicle driver watching the action of the scraper 26 and fluffer rake 42. At an end of the alley, the pull back scraper 45 is used to clean an area against the end wall. The vehicle 20 is then turned around (if there is room), or is simply backed out of the alley. To unload, the vehicle 20 is driven (front first) up to a dumping area, and the gate 48' is opened to dump collected stall and manure material, and the auger 47 is operated to move the material forwardly out of the tank 22 and over the front scraper 45 into a collection area.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A vacuum truck for use in cold and inclement weather to collect cold stall and manure material by vacuum, comprising:
   a self-propelled steerable vehicle including a frame;
   a storage tank on the frame;
   a scraper mounted on the frame and defining a collection area for scraped stall and manure material;
   a suction line extending from the collection area to the storage tank;
   a vacuum source operably connected to at least one of the collection area, the suction line, and the storage tank for creating suction to move the stall and manure material from the collection area along the suction line into the storage tank; and
   a heat source and a hot air line connecting the heat source to the suction line, whereby the vacuum truck can be used in cold and inclement weather without the cold stall and manure material collecting and plugging the collection area and plugging the suction line.

2. The vacuum truck defined in claim 1, wherein the hot air line communicates exhaust air from the vacuum source to the suction line.

3. The vacuum truck defined in claim 1, including an engine on the vehicle, and wherein the heat source includes exhaust from the engine.

4. The vacuum truck defined in claim 3, wherein the heat source also includes exhaust from the vacuum source.

5. The vacuum truck defined in claim 3, including a valve controlling flow of the engine exhaust.

6. The vacuum truck defined in claim 1, wherein the heat source is connected to heat the collection area.

7. The vacuum truck defined in claim 1, wherein the heat source is connected to heat the suction line.

8. The vacuum truck defined in claim 1, wherein the heat source heats an area under the storage tank.

9. The vacuum truck defined in claim 1, including an auger in the storage tank that agitates collected material in the storage tank.

10. The vacuum truck defined in claim 1, including an outlet pipe extending from the storage tank to a front of the frame for dumping collection material in a forward direction from the storage tank.

11. The vacuum truck defined in claim 1, wherein the scraper is curved to define a pocket for the collection area for collecting the stall and manure material when moving in a forward direction.

12. The vacuum truck defined in claim 1, wherein the scraper is lateral shiftable for movement between a home position generally under the frame, and a horizontally/laterally shifted position for reaching stall and manure material positioned laterally beyond the frame.

13. The vacuum truck defined in claim 1, including a pullback scraper positioned in front of the first-mentioned scraper.

14. The vacuum truck defined in claim 1, including a cabin for a driver of the vehicle, the cabin being positioned on a front portion of the frame, the cabin having windows with a lower edge that is below seat level, allowing the driver to see an area near an outer end of the scraper.

15. The vacuum truck defined in claim 1, including a cabin mounted on a front portion of the frame, and an engine mounted on a rear portion of the frame, the storage tank being in a middle of the frame and the vacuum source being on the rear portion of the frame.

16. The vacuum truck defined in claim 1, including a fluffer rake attached to an end of the scraper.

17. The vacuum truck defined in claim 1, including a slip-past abutment member on an outer end of the scraper to assist the scraper in moving past protruding obstructions encountered along a wall.

18. A vacuum truck for collecting stall and manure material by vacuum comprising:
   a self-propelled steerable vehicle including a frame;
   a front-mounted cabin on the frame for a driver operating the vehicle;
   a scraper supported on the frame and located at least as far forward as the cabin and visible from the cabin, the scraper being configured to collect stall and manure material in a collection area and being supported for movement between a home position generally under the cabin and a laterally-extended position;
   a vacuum suction apparatus on the frame for vacuuming the stall and manure material collected in front of the scraper and a suction line for moving the material to a tank;
   a heat source and hot air line connecting the heat source to the suction line for heating the stall and manure material during movement through the suction line; and
   an outlet opening located generally under the cabin and above the scraper for emptying collected stall and manure material from the tank to a location in front of the cabin.

19. The vacuum truck defined in claim 18, wherein the scraper is curved for collecting when moving in a forward direction.

20. The vacuum truck defined in claim 18, wherein the scraper is vertically adjustably supported by pivoting links on the frame.

21. The vacuum truck defined in claim 18, including a pullback scraper mounted in front of the first-mentioned scraper, the pullback scraper being operable to be lowered to pull back stall and manure material located against an end wall in front of the vehicle.

22. The vacuum truck defined in claim 18, including a cabin on the frame having windows with a low edge located below seat level in the cabin, allowing the driver to see an outer end of the scraper during operation of the vehicle.

23. A vacuum truck for collecting stall and manure material by vacuum comprising:
- a self-propelled steerable vehicle including a frame, a driver cabin; and rails attached to the frame;
- at least one scraper supported under the driver cabin by the frame and located at a front end of the frame, the at least one scraper being supported for linear movement along the rails, the at least one scraper being linearly laterally shifable relative to the frame between a home position generally under the frame and a laterally-extended horizontally shifted position for reaching stall and manure material not reachable from the home position;
- a vacuum suction apparatus on the frame for vacuuming stall and manure material collected by the at least one scraper and for moving the material to a tank.

24. The vacuum truck defined in claim 23, wherein the at least one scraper includes a curved scraper for collecting the stall and manure material when moving in a forward direction.

25. The vacuum truck defined in claim 23, wherein the at least one scraper includes a primary scraper that is laterally shiftable to reach stall and manure material located outward of the vehicle frame.

26. The vacuum truck defined in claim 25, wherein the at least one scraper includes a pullback scraper mounted on a front of the frame, the pullback scraper being operable to be lowered to pull back stall and manure material located against an end wall in front of the vehicle.

27. The vacuum truck defined in claim 26, wherein the at least one scraper includes an abutment member for engaging protrusions along a wall and wherein the at least one scraper is laterally shiftable by the abutment member to assist in moving past the protrusions.

28. The vacuum truck defined in claim 23, including a fluffer rake attached to an end of the at least one scraper.

29. A vacuum truck for collecting stall and manure material by vacuum comprising:
- a self-propelled steerable vehicle including a frame and a driver cabin on a front portion of the frame;
- a storage tank on the frame;
- a scraper on the frame;
- a vacuum suction apparatus on the frame for vacuuming manure and stall material collected in front of the scraper and for moving the material to the storage tank; and
- an outlet opening located under the driver cabin and above the scraper and connected to the storage tank for emptying the storage tank, the outlet opening being located to dump collected stall and manure material over the scraper in a visible location in front of the frame.

30. The vacuum truck defined in claim 29, including an auger positioned in the storage tank for agitating collected material to prevent settling, and also to assist in emptying the storage tank.

31. The vacuum truck defined in claim 29, including an outlet tube extending forwardly from the storage tank to the outlet opening, and including a gate valve operably positioned at the outlet opening for sealingly closing the opening.

32. The vacuum truck defined in claim 29, wherein the outlet opening is located generally above the scraper in a location where the auger dumps collected material over a front of the scraper.

* * * * *